United States Patent

[11] 3,624,162

| [72] | Inventor | Rolf Sieber |
| | | Cologne Longerich, Germany |
| [21] | Appl. No. | 660,600 |
| [22] | Filed | Aug. 15, 1967 |
| [45] | Patented | Nov. 30, 1971 |
| [73] | Assignee | Wacker-Chemie G.m.b.H. |
| | | Munich, Germany |
| [32] | Priority | Aug. 17, 1966 |
| [33] | | Germany |
| [31] | | W 42235 |

[54] PROCESS FOR MAKING 4,4'-DIHYDROXY STILBENES
2 Claims, No Drawings

[52] U.S. Cl. ..................................................... 260/619 B,
   260/619 A
[51] Int. Cl. ...................................................... C07c 37/00
[50] Field of Search ............................................. 260/619,
   619 B, 619 A

[56] References Cited
UNITED STATES PATENTS

| 2,305,748 | 12/1942 | Vargha ......................... | 260/619 |
| 2,349,770 | 5/1944 | Tendick ........................ | 260/619 |
| 2,393,570 | 1/1946 | Salmon et al. ................ | 260/619 |
| 2,410,463 | 11/1946 | Schwartzkopf ............... | 260/619 |

OTHER REFERENCES

Lapkin et al. Chemical Abstracts, Vol. 64 (1966) pg. 11112e.

*Primary Examiner*—Leon Zitver
*Assistant Examiner*—Norman P. Morgenstern
*Attorney*—Donald Malcolm ABSTRACT: This invention relates to 4,4'-dihydroxy stilbenes, and it has for its object to provide a simple and efficient process for making such compounds.

PROCESS FOR MAKING 4,4'-DIHYDROXY STILBENES

BACKGROUND OF THE INVENTION

Because of its oestrogenic effect, 4,4'-dihydroxy stilbene has a definite significance in biology, physiology and biochemistry. Various methods are described in the literature for its manufacture. For instance, 4,4'-dihydroxy stilbene is formed during reduction of β,β,β,-trichloro-α-α-bis-(4-hydroxyphenyl)-ethane with powdered iron in acetic solution or with powdered zinc in alcohol. One can also obtain 4,4'-dihydroxy stilbene by diazotizing 4,4'-diamino stilbene and concentrating the diazonium salt or by demethylizing the 4,4'-dimethoxy stilbene.

All these methods of producing 4,4'-dihydroxy stilbene are methods of formation which in part initially require stilbene bodies or other complicated starting compounds, and they do not represent a technological manufacturing method.

SUMMARY OF THE INVENTION

I have now discovered that one can obtain 4,4'-dihydroxy stilbene of the general formula

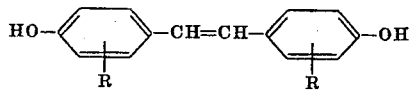

where R represents hydrogen and/or one or several alkyl groups or aryl groups and/or one or several halogen atoms, in a simple manner and with excellent yields, if one condenses phenol or substituted phenols with a free p-position to the phenolic OH group of the general formula

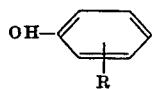

where R represents hydrogen and/or one or several halogen atoms and/or one or several alkyl groups or aryl groups, - with monohalogenated acetaldehyde in the presence of glacial acetic acid with concentrated sulfuric acid at temperatures of −20° to +25° C., particularly −10° to +10° C., dehydrohalogenates the condensation product with alcoholic alkali liquor and transposes the dehydrohalogenation product by heating to temperatures of 150° to 220° C., appropriately in the presence of a suitable solvent, into the corresponding 4,4'-dihydroxy stilbene.

DESCRIPTION OF THE PREFERRED EMBODIMENTS

According to the invention, therefore, one can use phenolic components, e.g. phenol, o-cresol, m-cresol, 2,3-dimethyl phenol, 2,6-dimethyl phenol, o-chlorophenol, 2-chloro-3-methyl phenol.

The monohalogenated acetaldehyde used for condensation, e.g. monochloracetaldehyde or monobromacetaldehyde are suitably used in the process of the invention in the form of acetals, particularly dimethyl or diethyl acetal.

It is useful to dehydrohalogenate the condensation product from the phenolic component and the monohalogenated acetaldehyde —with potassium hydroxide or sodium hydroxide in methyl- or ethyl-alcoholic solution at the boiling point of the solvent.

According to the invention, the transposing of the dehydrohalogenation product is usefully performed in the presence of a suitable solvent, e.g. ethylene glycol, diethylene glycol monomethyl ether or nitrobenzene.

It is advantageous to perform the dehydrohalogenation of the condensation product even in one step with the transposition into the stilbene derivative if one uses a solution of potassium hydroxide or sodium hydroxide in ethylene glycol and heats the reaction mixture gradually to the boiling point of the solvent.

The completed 4,4'-dihydroxy stilbenes find their use as organic intermediate products, as stabilizers for organic substances which decompose by oxidation or the influence of heat, and as bifunctional components in building polycondensation products.

EXAMPLE

In a solution of 113 g. (1.2mol) phenol and 91.5 g. (0.6mol) monochloracetaldehyde diethyl acetal in 225 ml. glacial acetic acid cooled to 0° C. one adds drop by drop, under stirring, a mixture of 130 ml. concentrated sulfuric acid and 150 g. glacial acetic acid cooled to 0° C., in such a manner that the temperature in the reaction mixture does not rise above 6° C. Continuing the stirring, and after adding sulfuric acid, the reaction mixture is allowed to warm up to room temperature, it is subsequently poured on ice and the organic phase is taken up in ether. After withdrawing the ether in a water jet vacuum one places the liquid residue into a refluxing boiling solution of 222 g. potassium hydroxide in 600 ml. methanol, adds the reaction mixture in water, makes it acid with dilute sulfuric acid and takes up the organic phase in ether. After withdrawal of the ether the residue is dissolved in ethylene glycol and the solution is heated up to the boiling point of the solvent. From the solution one obtains 4,4'-dihydroxy stilbene with a yield of 95percent referred to the quantity of monochloracetaldehyde acetal used. Fp 285°–186° C.

In the same manner one obtains from o-cresol 4,4'-dihydroxy-3,3'-dimethyl stilbene with a yield of 90.2percent referred to the quantity of monochloracetaldehyde acetal used. Fp 223° C.

In the same manner one obtains from o-chlorophenol, with a yield of 80.0 percent, referred to the quantity of monochloracetaldehyde acetal used, 4,4'-dihydroxy-3,3'-dichloro stilbene. Fp 195° C.

The invention claimed is:

1. Process for making 4,4'-dihydroxy stilbenes of the formula

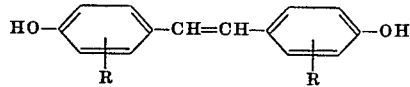

where R is selected from the group consisting of hydrogen, chlorine, alkyl and aryl, which comprises condensing phenol or a substituted phenol with free p-position to the phenolic OH-group of the formula

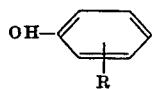

where R is selected from the group consisting of hydrogen, chlorine, alkyl, and aryl with monochloro- or monobromo-acetaldehyde in the presence of glacial acetic acid and sulfuric acid at a temperature of −20° to +25° C., dehydrohalogenating the condensation product with a solution of potassium or sodium hydroxide in methanol or ethanol and transposing the dehydorhalogenation product by heating to a temperature of 150° to 220° C. in the presence of a solvent selected from the group consisting of ethylene glycol, diethylene glycol monomethyl ether and nitrobenzene, into the corresponding stilbene.

2. Process according to claim 1, characterized by the fact that the monochloro- or monobromo-acetaldehyde is used in the form of an acetal.

* * * * *